US008880512B2

(12) United States Patent
Xing et al.

(10) Patent No.: US 8,880,512 B2
(45) Date of Patent: Nov. 4, 2014

(54) METHOD, APPARATUS AND SYSTEM, FOR REWRITING SEARCH QUERIES

(75) Inventors: Fei Xing, Hangzhou (CN); Jing Dong, Hangzhou (CN); Ning Guo, Hangzhou (CN); Lei Hou, Hangzhou (CN); Qin Zhang, Hangzhou (CN)

(73) Assignee: Alibaba Group Holding Limited, Grand Cayman, KY (US)

( * ) Notice: Subject to any disclaimer, the term of this patent is extended or adjusted under 35 U.S.C. 154(b) by 51 days.

(21) Appl. No.: 12/863,482

(22) PCT Filed: Apr. 30, 2010

(86) PCT No.: PCT/IB2010/001094
§ 371 (c)(1),
(2), (4) Date: Dec. 8, 2010

(87) PCT Pub. No.: WO2010/131101
PCT Pub. Date: Nov. 18, 2010

(65) Prior Publication Data
US 2011/0082860 A1 Apr. 7, 2011

(30) Foreign Application Priority Data
May 12, 2009 (CN) .......................... 2009 1 0135276

(51) Int. Cl.
*G06F 7/00* (2006.01)
*G06F 17/30* (2006.01)

(52) U.S. Cl.
CPC ... *G06F 17/30672* (2013.01); *Y10S 707/99933* (2013.01)
USPC .......... 707/722; 707/728; 707/731; 707/736; 707/999.003

(58) Field of Classification Search
USPC ........................................................ 707/728
See application file for complete search history.

(56) References Cited

U.S. PATENT DOCUMENTS

| 5,649,221 A | 7/1997 | Crawford et al. |
| 6,401,084 B1 | 6/2002 | Ortega et al. |

(Continued)

FOREIGN PATENT DOCUMENTS

| CN | 101027667 | 8/2007 |
| CN | 101241512 | 8/2008 |

(Continued)

OTHER PUBLICATIONS

Chinese Office Action mailed Feb. 13, 2012 for Chinese patent application No. 200910135276.X, a counterpart foreign application of U.S. Appl. No. 12/863,482, 12 pages.

(Continued)

*Primary Examiner* — Hosain Alam
*Assistant Examiner* — Azam Cheema
(74) *Attorney, Agent, or Firm* — Lee & Hayes, PLLC

(57) ABSTRACT

A search system includes: a data rewriting system that obtains, from a database, one or more search term candidates that are relevant to a present search query. The data rewriting system retrieves properties of the present search query and the one or more search term candidates, where the properties describe respective matching results of the present search query and the one or more search term candidates. Based at least in part on the matching results, the data rewriting system determines whether or not the present search query needs to be rewritten, and rewrites the present search query based at least in part on the matching results to provide a rewritten present search query if it is determined that the present search query needs to be rewritten. A search engine performs a search based at least in part on the rewritten present search query.

15 Claims, 8 Drawing Sheets

(56) References Cited

U.S. PATENT DOCUMENTS

| | | | |
|---|---|---|---|
| 7,392,238 B1* | 6/2008 | Zhou et al. | 1/1 |
| 7,536,382 B2* | 5/2009 | Zhou et al. | 1/1 |
| 7,636,714 B1 | 12/2009 | Lamping et al. | |
| 7,653,618 B2 | 1/2010 | Andreev et al. | |
| 7,698,331 B2* | 4/2010 | Carson et al. | 707/728 |
| 7,725,465 B2* | 5/2010 | Liao et al. | 707/728 |
| 2002/0059220 A1* | 5/2002 | Little | 707/5 |
| 2004/0249808 A1* | 12/2004 | Azzam et al. | 707/4 |
| 2005/0222976 A1* | 10/2005 | Pfleger | 707/3 |
| 2005/0289168 A1* | 12/2005 | Green et al. | 707/101 |
| 2006/0026152 A1* | 2/2006 | Zeng et al. | 707/5 |
| 2006/0224552 A1* | 10/2006 | Riezler et al. | 707/1 |
| 2007/0214158 A1 | 9/2007 | Kamen | |
| 2008/0091670 A1* | 4/2008 | Ismalon | 707/5 |
| 2008/0294619 A1* | 11/2008 | Hamilton et al. | 707/5 |
| 2009/0006363 A1* | 1/2009 | Canny et al. | 707/5 |
| 2009/0037399 A1* | 2/2009 | Bartz et al. | 707/5 |
| 2009/0055380 A1* | 2/2009 | Peng et al. | 707/5 |
| 2009/0055386 A1* | 2/2009 | Boss et al. | 707/5 |
| 2009/0094221 A1* | 4/2009 | Cameron et al. | 707/5 |
| 2009/0265303 A1* | 10/2009 | Parikh et al. | 707/2 |
| 2010/0017390 A1 | 1/2010 | Yamasaki et al. | |
| 2010/0042405 A1* | 2/2010 | Tsuzuki et al. | 704/10 |
| 2010/0205198 A1* | 8/2010 | Mishne et al. | 707/759 |

FOREIGN PATENT DOCUMENTS

| | | |
|---|---|---|
| CN | 101276361 | 10/2008 |
| JP | 04096176 | 3/1992 |
| JP | 2007164635 | 6/2007 |
| JP | 2009080577 A | 4/2009 |

OTHER PUBLICATIONS

Extended European Search Report mailed Jan. 22, 2013 for European patent application No. 10774604.2, 5 pages.

Translated Japanese Office Action mailed Dec. 3, 2013 for Japanese patent application No. 2012-510381, a counterpart foreign application of U.S. Appl. No. 12/863,482, 6 pages.

Chinese Office Action mailed Jul. 27, 2012 for Chinese patent application No. 200910135276.X, a counterpart foreign application of U.S. Appl. No. 12/863,482, 15 pages.

PCT Intl Search Report and Written Opinion for Application No. PCT/IB2010/001094, dated Sep. 30, 2010, 11 pgs.

Translated Copy of the Japanese Office Action mailed Jun. 17, 2014 for Japanese patent application No. 2012-510381, a counterpart foreign application of U.S. Appl. No. 12/863,482, 7 pages.

* cited by examiner

METHOD, APPARATUS AND SYSTEM, FOR REWRITING SEARCH QUERIES

CROSS REFERENCE TO RELATED PATENT APPLICATIONS

This application is a national stage application of an international patent application PCT/IB2010/001094, filed Apr. 30, 2010, claiming priority from Chinese Patent Application No. 200910135276.X, filed May 12, 2009, both entitled "SEARCH METHOD, APPARATUS AND SYSTEM," which applications are hereby incorporated in their entirety by reference.

TECHNICAL FIELD

The present disclosure relates to a network data processing field and, more particularly, to search methods, apparatuses and systems.

BACKGROUND

A search engine is in general a system that provides search services to a user after collecting, organizing, and processing information on the Internet based on certain strategies implemented by designated computer programs. From a user's perspective, a search engine provides a web page that includes a search box. After a keyword is inputted in the search box and submitted to the search engine through a browser, the search engine returns a list of information that is relevant to the content inputted by the user. In this sense, the keyword inputted by the user becomes search term. Specifically, the user searches relevant contents of interest using the search term.

In a practical application, contents relevant to user-input search term may be occasionally missed for retrieval. For example, when the search term of a user is "Black Lenovo Thinkpad Laptop X60", the search engine may not find a completely matched search result because the input search keyword is too long. Therefore, the browser returns no search result. When the search term is modified to be "Thinkpad Lenovo Laptop X60", relevant results may then be retrieved from the search because the inputted search keyword is shorter. In view of this, rule-based search methods exist in existing technologies. One conventional method first segments the search term. Subsequently, based on properties of each phrase obtained after word segmentation (e.g., whether it is a noun, an adjective, or a type such as product's type, brand or model number and information of each phrase), the method concludes certain rules according to the needs. For example, one rule may be that if phrases of two product types are close to each other, the latter has a higher weight. For instance, in "mobile phone charger", "charger" may have a higher weight. Using the above method of searching and rewriting based on a set of rules, the original search term may be rewritten into a new search term. A server of the search engine may subsequently perform a search using the new search term.

As illustrated from the above process, when performing a search, the search engine employs a method that rewrites the user-inputted search terms based on certain rules. Because each rewriting operation requires relevant rules that have been set up by a staff in advance and because search terms inputted by users through respective browsers may be of numerous types, the error rate of this simple rule-based method of rewriting search terms tends to be relatively high. Moreover, because of the existence of ambiguity, a result obtained after rewriting a search term may sometimes be inaccurate. Results obtained in a search that is based on an inaccurate rewritten search term may not be what the user wants, thus reducing user experience of the search engine.

In short, an existing technical problem that badly needs to be solved by one of ordinary skill in the art related to how to create a search method that solves the problem of inaccurate search results caused by searching after rule-based rewriting of search terms in existing technologies.

SUMMARY OF THE DISCLOSURE

The technical problem to be solved in the present disclosure is to provide a search method for solving the problem of inaccurate search results caused by searching after rule-based rewriting of search term in existing technologies, and for further improving relevance and recall rate.

The present disclosure further provides a search apparatus to ensure implementation and application of the above method in practice.

In one aspect, a search method performs acts including: obtaining, from a database, one or more search term candidates that are relevant to a present search term; retrieving properties of the present search term and the one or more search term candidates, the properties describing respective matching result of the present search term and the one or more search term candidates; determining whether or not the present search term needs to be rewritten based on the matching results; when it is determined that the present search term needs to be rewritten, rewriting, by a data rewriting system, the present search term to provide a rewritten present search term based on the matching results; and performing, by a search engine, a search based on the rewritten present search term.

Preferably, obtaining from a pre-established database one or more search term candidates that are relevant to the present search term further may include obtaining at least two search term candidates from the database. Additionally, determining whether or not the present search term needs to be rewritten based on the matching results may include: assigning values to the properties based on the matching results, each property having a corresponding property value; processing the property values based on one or more predetermined rule to obtain at least two matching result values corresponding to the at least two search term candidates; and determining whether or not a maximum matching result value of the at least two matching result values is greater than a first threshold.

Preferably, obtaining from a pre-established database one or more search term candidates that are relevant to the present search term may include obtaining one search term candidate from the database. Additionally, determining whether or not the present search term needs to be rewritten based on the matching results may include: assigning values to the properties of the one search term candidate and the present search term based on the matching results; processing the property values based on one or more predetermined rules to obtain one matching result value corresponding to the one search term candidate; and determining whether or not the matching result value is greater than a first threshold.

Preferably, processing the property values based on one or more predetermined rules may include processing the property values based on a linear weighting approach or converting the properties values into the matching result values based on a Maximum Entropy Model.

Preferably, the database may include search results corresponding to historical search terms. Additionally, upon determining that the present search term needs to be rewritten based on the matching results, the method may further include: determining whether or not the search term candidates corresponding to the matching results have corresponding search results; and when it is determined that the search term candidates corresponding to the matching results have corresponding search results, rewriting the present search term based on the matching results.

Preferably, obtaining search term candidates that are relevant to the present search term from a database may include: segmenting the present search term to provide a plurality of child search terms; establishing a respective identifier for each child search term; and performing matching based on the respective identifier of each child search term in the database to obtain search term candidates of the child search terms.

Preferably, retrieving the properties of the present search term and the search term candidates may include: comparing the child search terms with the search term candidates of the child search terms to provide a comparison result; and obtaining the matching results of the child search term and the search term candidates of the child search terms based on the comparison result.

Preferably, after performing a search based on the rewritten present search term, the method may further cause a search result to be displayed to a user client.

In another aspect, a search apparatus includes: an acquisition module that obtains, from a database, one or more search term candidates that are relevant to a present search term; a property retrieving module that retrieves properties of the present search term and the one or more search term candidates, the properties describing respective matching results of the present search term and the one or more search term candidates; a first determination module that determines whether or not the present search term needs to be rewritten based on the matching results; a rewriting module that rewrites the present search term based on the matching results; and a searching module that performs a search using the rewritten present search term.

Preferably, when the acquisition module is configured to obtain at least two search term candidates from the database, the first determination module may include: a first value assigning sub-module that assigns values to the properties based on the matching results with each property having a corresponding property value; a first processing sub-module that processes the property values based on one or more predetermined rules to obtain at least two matching result values that correspond to the at least two search term candidates; and a first determination sub-module that determines whether or not a maximum matching result value of the at least two matching result values is greater than a first threshold.

Preferably, when the acquisition module is configured to obtain a search term candidate from the database, the first determination module may include: a second value assigning sub-module that assigns values to the properties of the search term candidate and the present search term based on the matching results; a second processing sub-module that processes the property values based on one or more predetermined rules to obtain a matching result value that corresponds to the search term candidate; and a second determination sub-module that determines whether or not the matching result value is greater than a first threshold.

Preferably, the first processing sub-module or the second processing sub-module may process the property values based on a linear weighting approach or convert the property values into the matching result values based on a Maximum Entropy Model.

Preferably, when the database comprises search results of historical search terms, the apparatus may further include: a second determination module that determines whether or not the search term candidates corresponding to the matching results have corresponding search results; and an execution module that rewrites the present search term based on the matching results when it is determined that the search term candidates corresponding to the matching results have corresponding search results.

Preferably, the acquisition module may include: a word segmenting sub-module that segments the present search term into a plurality of child search terms and establishes a respective identifier for each child search term; and a matching sub-module that obtains the one or more search term candidates from the database based on the identifiers of the child search terms.

Preferably, the acquisition module may further include: a comparison sub-module that compares the child search terms with the one or more search term candidates to provide a comparison result; and a matching result acquisition sub-module that obtains the matching results of the child search terms and the one or more search term candidates based on the comparison result.

Preferably, the apparatus may further include a result displaying module that causes a search result to be displayed to a user client.

In yet another aspect, a search system includes a data rewriting system and a search engine. The data rewriting system may: obtain, from a database, one or more search term candidates that are relevant to a present search term; retrieve properties of the present search term and the one or more search term candidates, the properties describing respective matching results of the present search term and the one or more search term candidates; determine whether or not the present search term needs to be rewritten based on the matching results; and rewrite the present search term based on the matching results to provide a rewritten present search term. The search engine may perform a search based on the rewritten present search term.

Compared with existing technologies, the present disclosure provides multiple advantages as described below.

In accordance with the present disclosure, a series of search term candidates may be matched through a pre-established database on a server end of a search engine. The search term candidates are historical search terms that are relevant to the present search term. On the server end, matching results of the present search term and the search term candidates are obtained. Among the search term candidates, an optimal search term candidate is found, and the present search term is rewritten. Therefore, the server can use the rewritten present search term as a keyword for the search, thus it avoids the use of fixed rules when rewriting the present search term prior to searching if according to existing technologies. This reduces the probability of having ambiguity in the search process, and improves search accuracy. Furthermore, the disclosed method, apparatus and system can further improve relevancy and recall rate of a search result of the present search term. Any product implementing the present disclosure may not necessarily achieve all the above advantages at the same time.

DESCRIPTION OF DRAWINGS

In order to aid the understanding of the technical scheme of the exemplary embodiments of the present disclosure, accompanying figures are provided and briefly described below. The following figures represent only a few exemplary embodiments of the present disclosure. Based on these accompanying figures, one of ordinary skill in the art can obtain other figures without inserting any creativity or effort.

DETAILED DESCRIPTION

Figure 1:
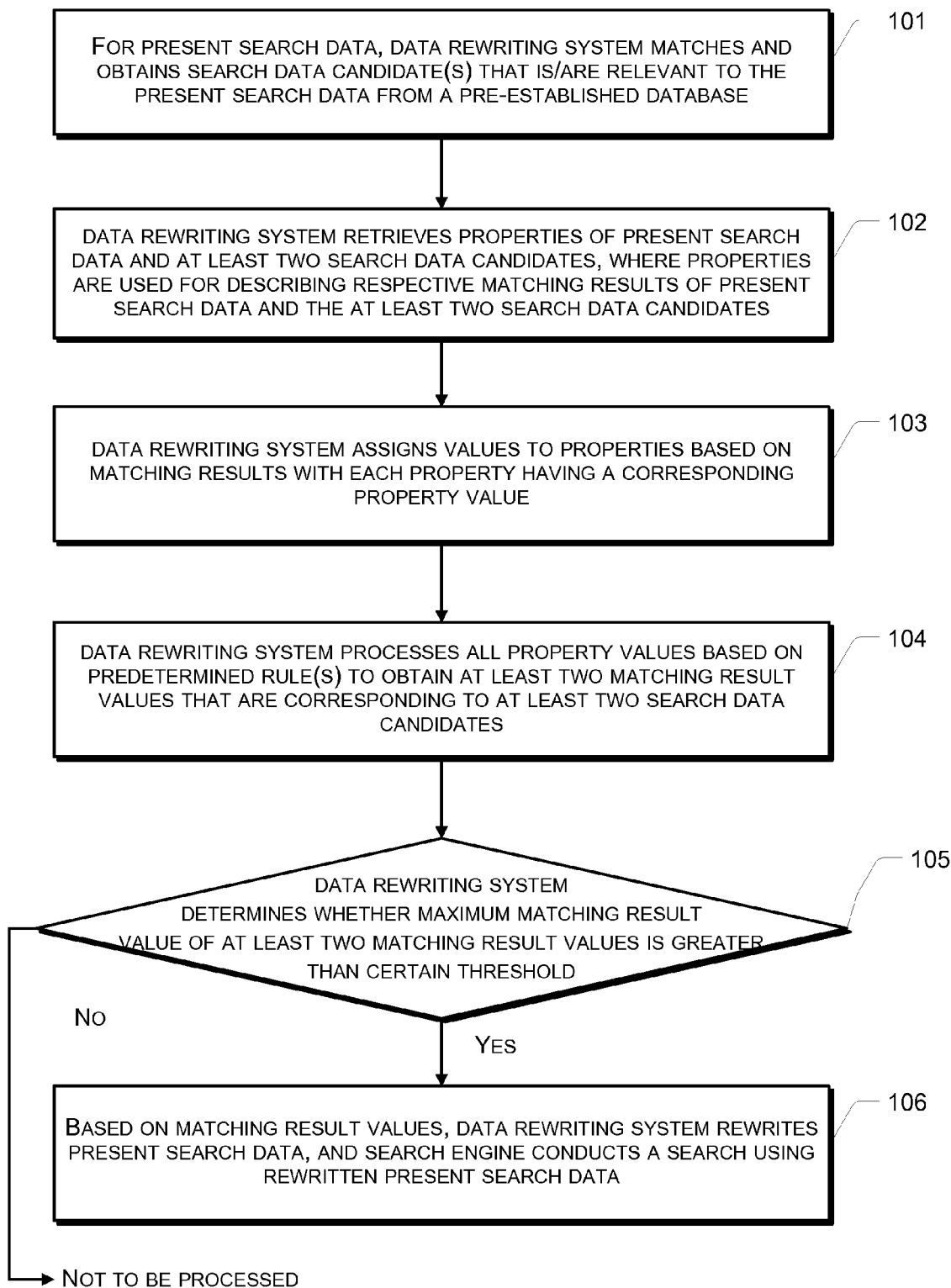
FIG. 1 shows a flow chart of a first exemplary search method in accordance with the present disclosure.

The technical scheme in the exemplary embodiments of the present disclosure is described more clearly and completely below with reference to the accompanying figures in the exemplary embodiments. The exemplary embodiments described herein only constitute parts, but not all, of exemplary embodiments of the present disclosure. Based on the exemplary embodiments of the present disclosure, one of ordinary skill in the art can obtain all other exemplary embodiments, which are still within the scope of the present disclosure, without the need of any innovative effort.

The disclosed method, apparatus and system may be used in an environment or in a configuration of universal or specialized computer systems. Examples include a personal computer, a server computer, a handheld device or a portable device, a tablet device, a multi-processor system, and a distributed computing environment including any system or device above.

The present disclosure may be described within a general context of computer-executable instructions executed by a computer, such as a program module. Generally, a program module includes routines, programs, objects, modules, and data structure, etc., for executing specific tasks or implementing specific abstract data types. The disclosed method and server may also be implemented in a distributed computing environment. In the distributed computing environment, a task is executed by remote processing devices which are connected through a communication network. In the distributed computing environment, the program module may be located in storage media (which include storage devices) of local and remote computers.

In one embodiment, the disclosed system may structurally include a pre-established database, a search log, a data rewriting system, a search engine, and a user client. Upon receiving a search term inputted by a user, referred to as the present search term, the search engine transmits the present search term to the data rewriting system. The data rewriting system matches the present search term in the pre-established database to obtain one or more historical search terms that are relevant to the present search term (i.e., search term candidates), retrieve properties of the present search term and search term candidates (where the properties are used for describing respective one or more matching results of the present search term and the search term candidates), and determine whether the matching results indicate that rewriting the present search term is required. If affirmative, the present search term is rewritten according to the matching results. The search engine then performs a search using the rewritten search term. The pre-established database stores historical search terms of the user client, and may be implemented in a form of a search log or other approach. When the search engine conducts a search using the rewritten search term, the accuracy and recall rate of associated results are improved. The recall rate is referred to as a ratio between the number of relevant documents having been found and the number of all relevant documents in a document repository.

When the core concept of the present disclosure is instantiated into a true entity, that entity can be implemented using an acquisition module, a property retrieving module, a first determination module, a rewriting module, and a searching module. The acquisition module matches and obtains, for present search term, one or more search term candidates that are relevant to the present search term from a pre-established database. The property retrieving module retrieves properties of the present search term and the search term candidates, where the properties are describe respective matching results of the present search term and the search term candidates. The first determination module determines whether the present search term needs to be rewritten in view of the matching results. The rewriting module rewrites the present search term based on the matching results. The searching module performs a search using the rewritten search term. Accuracy and recall rate of associated result can be improved when search is performed using a present search term that is rewritten into that entity.

FIG. 1 shows a flow chart of a first exemplary method 100 in accordance with the present disclosure. The method 100 may include actions as described below.

At 101, for a present search term, a data rewriting system matches and obtains, from a pre-established database, one or more search term candidates that are relevant to the present search term.

The database stores historical search terms of a user client. The one or more search term candidates are historical search terms relevant to the present search term. The pre-established database may be implemented in a form of a search log of a search engine. The search log refers to log information of search terms and search results of the user client that has been collected by the search engine, i.e., the historical search terms of the user client. The database may further record detailed information such as click rates and exposure rates of the search results. Alternatively, data content in the search log may be used for re-establishing a new database. In the present embodiment, the data rewriting system obtains at least two search term candidates. Moreover, the content of each search term candidate that has been matched and the content of the present search term include at least one phrase or word that is in common.

At 102, the data rewriting system retrieves properties of the present search term and at least two search term candidates, where the properties describe respective matching results of the present search term and each of the at least two search term candidates.

Upon obtaining the at least two search term candidates, the data rewriting system matches the present search term with each of the at least two search term candidates to retrieve properties of the present search term and each of the search term candidate. A property may be referred to as "number of matches associated with brand" between the present search term and any one search term candidate, for instance. An example is the number of matches associated with "Nokia", i.e., whether the brand "Nokia" appears in the present search term and a search term candidate. If affirmative, a respective property value will be assigned to be 1 during subsequent value assignment. If not, the respective property value will be assigned to be 0. Other examples include "number of matches associated with product" such as the number of matches associated with "mobile phone", and so forth. These two described phrases of the matching results are therefore the contents of the properties.

At 103, the data rewriting system assigns values to the properties based on the matching results with each property having a corresponding property value.

Values are assigned to the properties based on the matching results. For example, a property "number of matches associated with brand" have a value of 1 in the present search term and a search term candidate means that a certain brand name is included and appears once in both the present search term and the search term candidate. The property value of this property is therefore 1. Upon value assignment, each property has a corresponding property value.

At 104, the data rewriting system processes all the property values based on one or more predetermined rules to obtain at least two matching result values that correspond to the at least two search term candidates.

The predetermined rules may include a rule satisfying a certain linear weighting, or may be implemented using a Maximum Entropy Model, i.e., converting the property values into matching result values using such probability model as Maximum Entropy Model. The predetermined rules may be designated in advance according to practical needs. The data rewriting system processes the property values according to the predetermined rules. Specifically, property values associated with each search term candidate are computed in order to obtain a matching result value for each search term candidate. In practice, the matching result value may be any arbitrary value, e.g., a decimal number such as 0.8 or 0.6, or an integer such as 2 or 5. In the present disclosure, a more optimal result may be obtained using the Maximum Entropy Model.

At 105, the data rewriting system determines whether a maximum matching result value of the at least two matching result values is greater than a certain threshold. If affirmative, the process continues to 106. Otherwise, no further processing is performed.

The data rewriting system determines whether or not rewriting the present search term is required. A certain threshold may be set up in advance for the data rewriting system. The data rewriting system then determines whether or not a maximum matching result value of the matching result values is greater than that threshold. If affirmative, the search term candidate corresponding to that matching result value is more optimal than the present search term, where "more optimal than the present search term" may be interpreted as that the search term candidate has a relatively high degree of matching with the present search term and has fewer unnecessary words. For example, let the threshold be 0.9. When the threshold is 0.9, the present search term needs to be rewritten when a matching result value of a particular search term candidate and the present search term is a maximum and is greater than 0.9. Specifically, the present search term is rewritten so that particular search term candidate becomes the rewritten present search term. The threshold may be set up dynamically in response to the matching result values.

At 106, base on the matching result values, the data rewriting system rewrites the present search term so that the search term candidate becomes the rewritten present search term. The search engine then conducts a search using the rewritten present search term.

Thus, the original present search term of the user client is rewritten into a search term candidate, where a matching result value of the search term candidate is a maximum and is greater than the threshold. The search engine subsequently conducts a search using the rewritten present search term.

Compared with an existing method that performs a search after rule-based rewriting of a search term, the technical scheme in the present embodiment no longer uses manually established and fixed rules, but rather creates a pre-established database directly using a search log of the search engine. Alternatively or additionally, the user may set up and update the contents of that database himself. As such, various search terms may be rewritten using respective search term candidates that are matched therewith. Without the sole dependence on fixed rules, searching with the rewritten search term not only allows the disclosed search method to obtain higher accuracy and avoids generating ambiguity as a result of using the rules, but also improves recall rate of associated search results.

Figure 2:
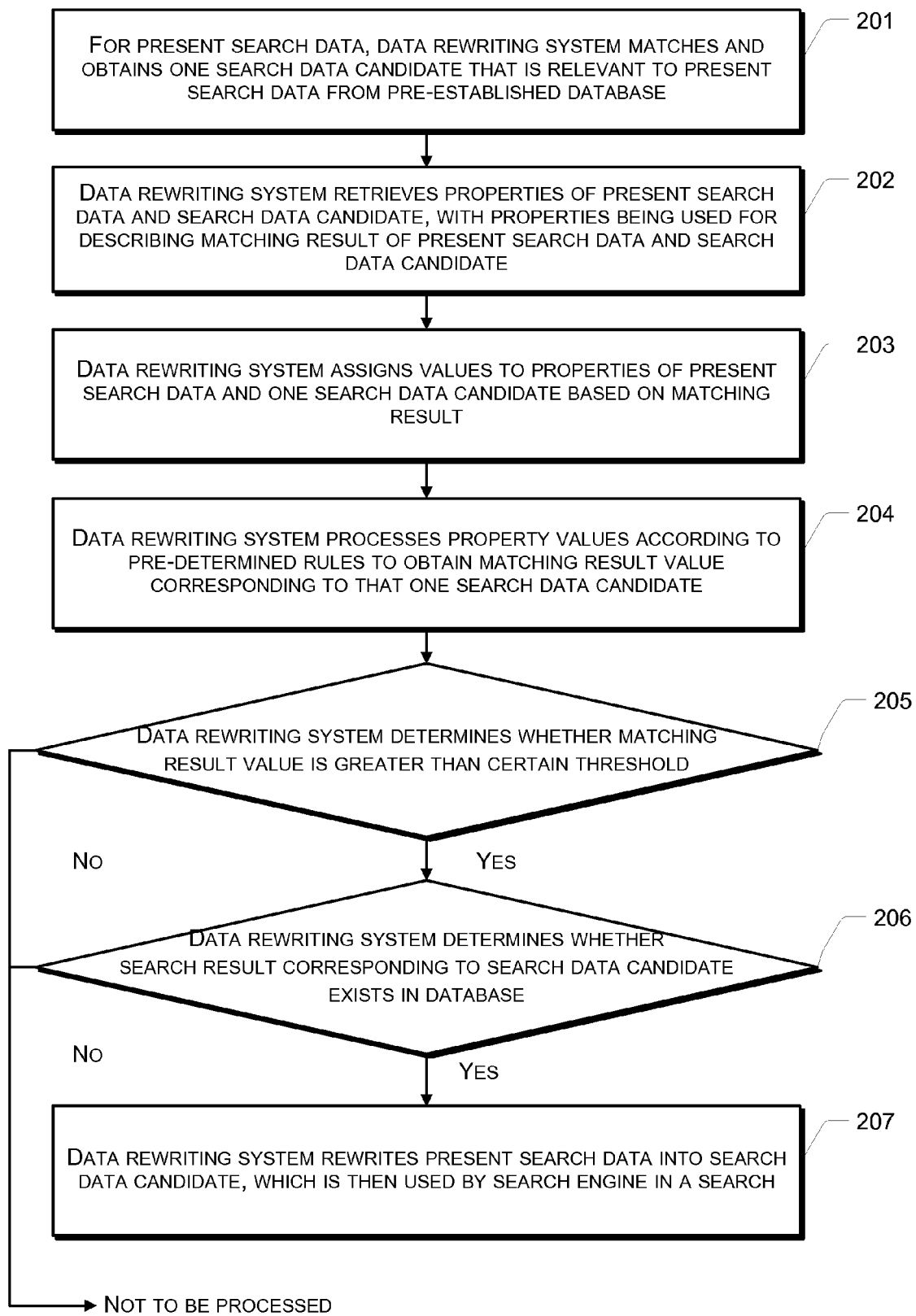
FIG. 2 shows a flow chart of a second exemplary search method in accordance with the present disclosure.

FIG. 2 shows a flow chart of a second exemplary search method 200 in accordance with the present disclosure. The method may include certain actions as described below.

At 201, for a present search term, a data rewriting system matches and obtains one search term candidate that is relevant to the present search term from a pre-established database.

In the present embodiment, the data rewriting systems matches and obtains only one search term candidate that is relevant to the present search term from the pre-established database. The data rewriting system may obtain search results corresponding to that search term candidate at the same time, with the search results including information such as web page identification, for example.

At 202, the data rewriting system retrieves properties of the present search term and the search term candidate, with the properties describing a matching result of the present search term and the search term candidate.

When retrieving properties of the present search term and the search term candidate, the data rewriting system may match the present search term with that one search term candidate to obtain the properties of the present search term and the one search term candidate, e.g., number of matches associated with brand, number of matches associated with product, and so forth.

At 203, the data rewriting system assigns values to the properties of the present search term and the search term candidate based on the matching result.

The data rewriting system assigns values to the properties based on the matching result. For example, the number of matches associated with a product in the present search term and the search term candidate may be 1. Specifically, a specific product name, e.g., "mobile phone", may be included and appear once in both the present search term and the search term candidate. A property value of the corresponding property is therefore 1. Upon value assignment, each property of the present search term and the search term candidate has a corresponding property value. A collection of all property values upon matching the search term candidate with the present search term is obtained.

At 204, the data rewriting system processes the property values according to pre-determined rules to obtain a matching result value corresponding to the search term candidate.

The data rewriting system may process the collection of the property values using linear weighting. Alternatively, a probability model such as the Maximum Entropy Model, the Hidden Markov Model, the Maximum Entropy Markov Model, or the Conditional Random Field Model may be used.

The data rewriting system processes the property values using a linear weighting approach or converts the property values into a matching result value using, for example, the Maximum Entropy Model.

At 205, the data rewriting system determines whether or not the matching result value is greater than a certain threshold. If not, no further processing is performed. If affirmative, the process continues to 206.

If the matching result value is greater than a certain threshold, the search term candidate corresponding to the matching result value is more optimal than the present search term.

At 206, the data rewriting system determines whether or not a search result corresponding to the search term candidate exists in the database. If not, no further processing is performed. If affirmative, the process continues to 207.

In the exemplary embodiment, the data rewriting system may determine whether or not the search term candidate corresponding to the matching result value has a corresponding search result in the database. If a search result is found, relevant results can be retrieved for this search term candidate. Recall rate is therefore improved when the server performs a search using that search term candidate.

At 207, the data rewriting system rewrites the present search term into the search term candidate, which is then used by a search engine in a search.

When the determination at 206 is affirmative, it indicates that this one search term candidate can allow the search engine to retrieve relevant results. Therefore, upon subsequent searching, relevant search results may be displayed to the user. In view of this, the present search term is rewritten into the search term candidate and searching is performed based on the search term candidate, which is now the rewritten present search term.

In the present embodiment, only one search term candidate is obtained and matched from the pre-established database in a server of the search engine. Therefore, when applying the method, properties of the present search term and this particular search term candidate are retrieved and a matching result value between them is computed. Depending on whether or not the matching result value is greater than the predetermined threshold, it is determined whether or not the search term candidate is more optimal than the present search term. Furthermore, whether or not a corresponding search result exists for the search term candidate is also determined. If affirmative, the server of the search engine will by default perform a search using the search term candidate. By further making a determination regarding search results of the search term candidate, this method not only has a higher accuracy compared with the existing method that performs a search after rule-based rewriting of search term, but also improves recall rate of associated search results.

Figure 3:
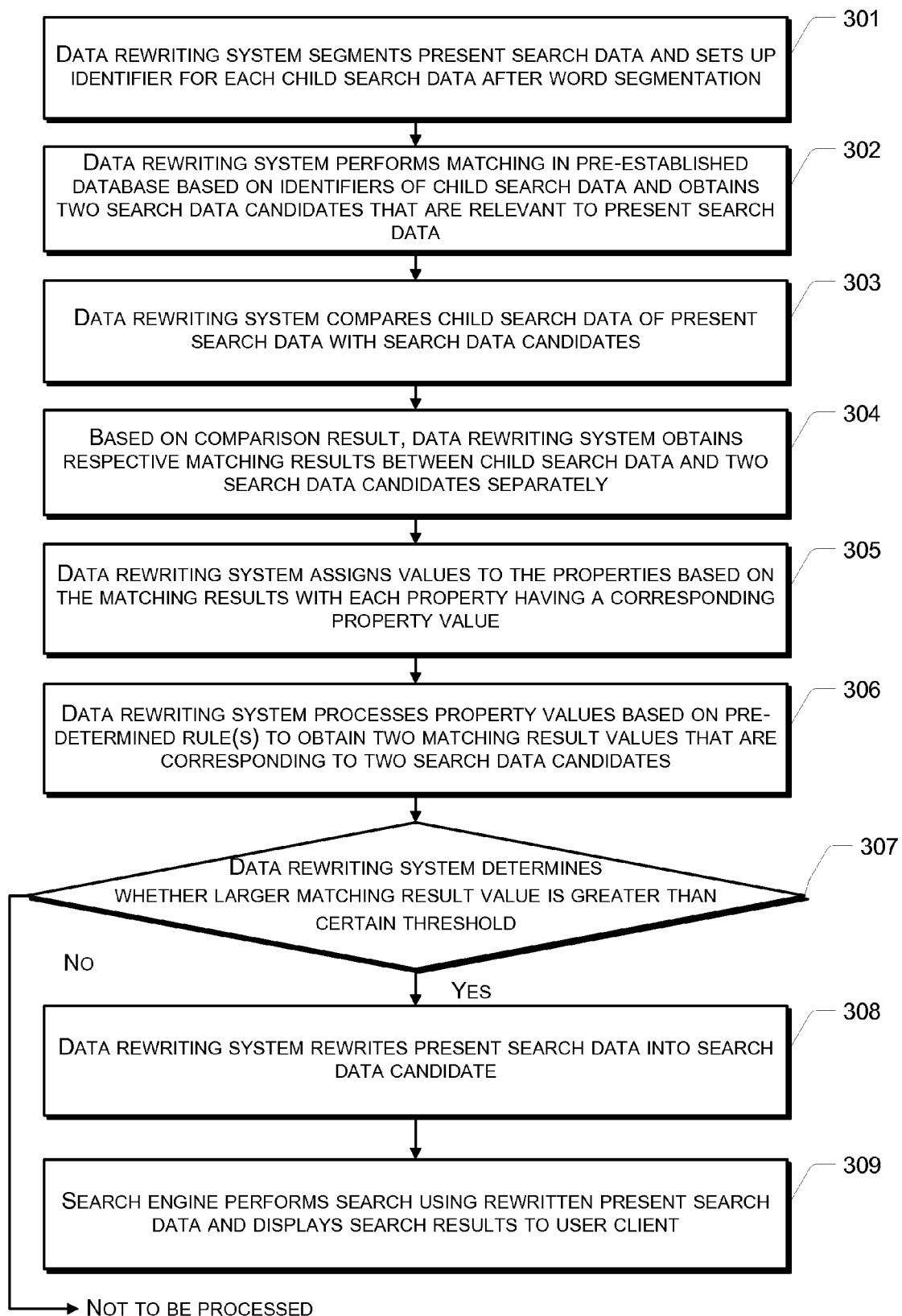
FIG. 3 shows a flow chart of a third exemplary search method in accordance with the present disclosure.

FIG. 3 shows a flow chart of a third exemplary search method 300 in accordance with the present disclosure. The present embodiment may be considered as an exemplary search method in practice. The method 300 may include certain actions as described below.

At 301, the data rewriting system segments a present search term of the user client into a plurality of child search terms, and sets up a respective identifier for each child search term.

In the present action, the data rewriting system may use a word segementer to segment the present search term into a plurality of child search terms, and then set up a respective identifier for each child search term thus obtained. For example, the present search term may be "red Nokia n95 mobile phone." Upon word segmentation and identifier setting, what may be obtained may be: "red (qualifier)/Nokia (brand)/n95 (model number)/mobile (product type)", where "red" is a child search term and "qualifier" is the respective identifier for that child search term, for example.

At 302, the data rewriting system performs matching in the pre-established database based on the identifiers of the child search terms to obtain two search term candidates. A pre-established database is used to store historical search terms of a user client. The search term candidates are historical search terms that are relevant to the present search term.

The data rewriting system performs matching in the pre-established database based on the identifiers of the child search term and obtains search term candidates from the historical search terms: "Nokia n95 mobile phone" and "red Nokia mobile phone", for example.

Specifically, an exemplary method of storing "red Nokia n95" in the database may similar to the one shown below.

| Qualifier | Brand | Model Number | Product Type | ... |
|---|---|---|---|---|
| Red | Nokia | N95 | Mobile Phone | |

The method of storing search term candidates in the database does not affect the implementation of the present exemplary embodiments. Alternative storing methods may be used for storing the search term candidates.

At 303, the data rewriting system compares the child search terms of the present search term with the search term candidates to provide a comparison result.

In the present embodiment, comparing the child search terms with the search term candidates may refer to separately comparing "red", "Nokia" and "mobile phone", etc, with "Nokia n95 mobile phone" and "red Nokia mobile phone", for example.

At 304, based on the comparison result, the data rewriting system obtains respective matching results between the child search terms and the two search term candidates separately.

Based on the comparison result, properties of the present search term "red Nokia n95 mobile phone" and "Nokia n95 mobile phone" may be obtained such as: "number of matches associated with qualifier", "number of matches associated with brand", "number of matches associated with model number", and "number of matches associated with product type." These properties may represent matching results between the present search term and the two search term candidates.

At 305, the data rewriting system assigns values to the properties based on the matching results with each property having a corresponding property value.

In the present embodiment, properties of the search term candidate "Nokia n95 mobile phone" include: number of matches associated with qualifier, number of matches associated with brand, number of matches associated with model number, and number of matches associated with product type, with property values obtained after matching this search term candidate with the present search term to be 1, 2, 1 and 1 respectively. For each search term candidate, each property has a corresponding property value.

At 306, the data rewriting system processes the property values based on one or more pre-determined rules to obtain two matching result values that are corresponding to the two search term candidates.

The predetermined rules may refer to computing according to a simple linear model, i.e., computing the matching result value by weighting all property values. Alternatively, a relatively complicated probability model such as the Maximum Entropy Model may be used. The results obtained in this action represent respective matching result values of the two search term candidates. For example, the matching result value of "Nokia n95 mobile phone" computed according to the Maximum Entropy Model may be 0.95 while the matching result value of the second search term candidate "red Nokia mobile phone" may be 0.8.

At 307, the data rewriting system determines whether or not a larger matching result value is greater than a certain threshold. If not, no further processing is performed. If affirmative, the process proceeds to 308.

The data rewriting system may set up a threshold in advance, e.g., 0.9, in this exemplary embodiment. When a matching result value is greater than this threshold, the corresponding search term candidate is an optimal search term candidate.

It is noted that in a practical application, a minimum threshold may further be set up. Specifically, when all matching result values are smaller than this minimum threshold, the present search term will not be rewritten. Moreover, when all matching result values are smaller than a certain maximum threshold, the present search term will be not rewritten.

At 308, the data rewriting system rewrites the present search term into the search term candidate.

Based on the previous determination result, the first search term candidate is more optimal than the present search term. In this exemplary embodiment, the present search term "red Nokia n95 mobile phone" is rewritten into "Nokia n95 mobile phone."

At 309, a search engine performs a search using the rewritten present search term and causes the search results to be displayed to the user client.

The server of the search engine may directly perform a search using the rewritten search term, i.e., the first search term candidate "Nokia n95 mobile phone", and causes those found results to be displayed to the user client.

Although specific values are shown in the present embodiment when properties of the present search term and the search term candidates are retrieved or when values are assigned to the properties, the present embodiment needs not be construed to one or more certain values in practice. One of ordinary skill in the art may use any method to assign values to the properties or compute matching result values based on the properties values. The present disclosure is not limited to any particular method. Any method, such as simply using linear weighting or the Maximum Entropy Model, for example, which is able to compute a matching result value that is in good agreement with the actual situation, is covered within the scope of the present disclosure.

For the sake of description, the above various exemplary methods are described in terms of a sequence of acts. However, one of ordinary skill in the art should understand that the present disclosure is not limited to the order in which the acts are performed. According to the present disclosure, certain actions may be performed in an alternative order or may be performed concurrently. Furthermore, one of ordinary skill in the art should appreciate that the exemplary embodiments described in this disclosure are preferred embodiments. The acts or modules involved therein may or may not be necessarily required by the present disclosure.

Figure 4:
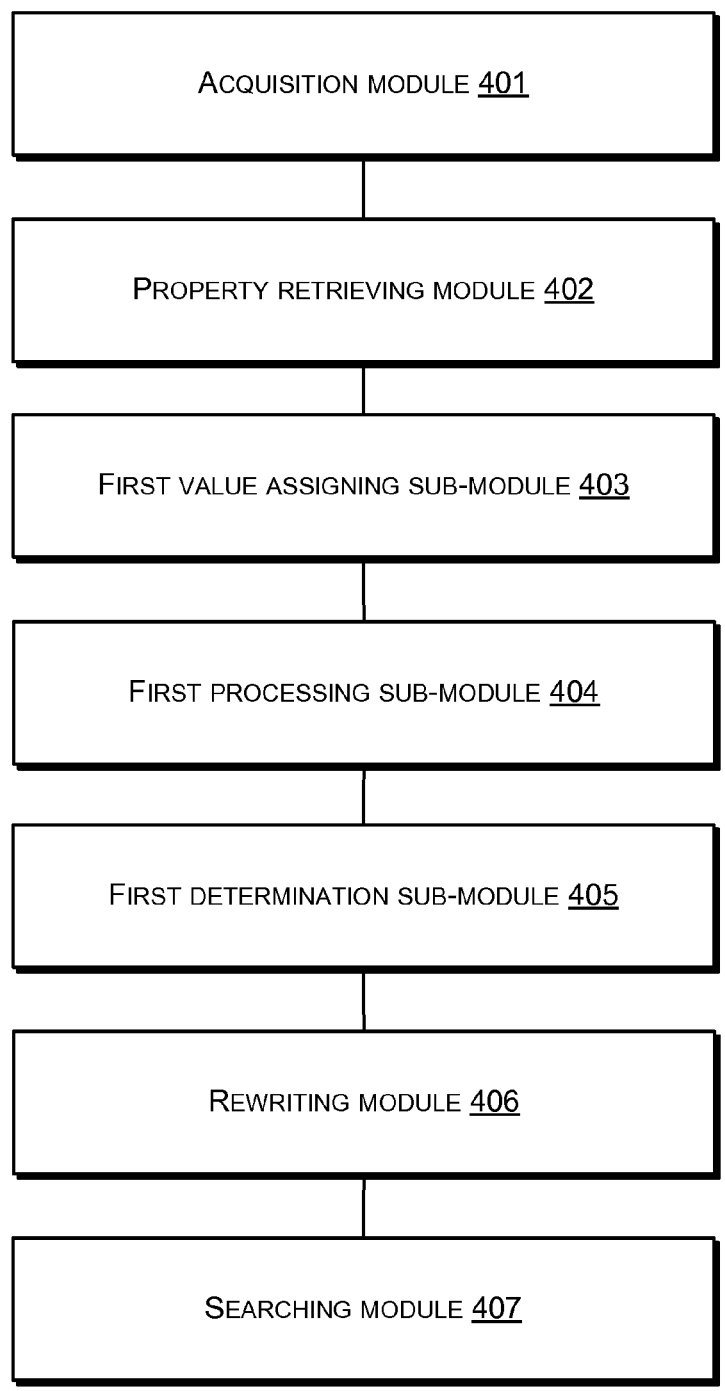
FIG. 4 shows a schematic structural diagram of a first exemplary search apparatus in accordance with the present disclosure.

Corresponding to the first exemplary method described in this disclosure, the present disclosure further provides a first exemplary search apparatus 400 which is shown in FIG. 4. In this exemplary embodiment, the apparatus 400 may include an acquisition module 401, a property retrieving module 402, a first value assigning sub-module 403, a first processing sub-module 404, a first determination sub-module 405, a rewriting module 406, and a searching module.

For a present search term, the acquisition module 401 matches and obtains, from a pre-established database, at least two search term candidates that are relevant to the present search term.

A server end of a search engine may set up the pre-established database in advance, which is used for storing historical search terms of a user client. The historical search terms in the database may be obtained through a search log. The search log may be referred to as log information that the search engine uses to collect search terms and search results of the user client. The database may further record detailed information such as, for example, click rates and exposure rates of the search results.

The property retrieving module 402 retrieves properties of the present search term and the search term candidates, where the properties describe respective matching results of the present search term and the search term candidates.

The property retrieving module 402 matches the present search term with the at least two search term candidates upon obtaining the at least two search term candidates to obtain properties of the present search term and each of the search term candidate. The properties may be, for example, a number of matches associated with brand and a number of matches associated with product in the present search term and a search term candidate.

The first value assigning sub-module 403 assigns values to the properties based on the matching results, with each property having a corresponding property value.

The first value assigning sub-module 403 assigns values to the properties based on the matching results. For example, in the present search term and one of the search term candidates, the number of matches associated with brand is 1, indicating that a certain brand name may be included and appears once in the present search term and that search term candidate. Therefore, the property value of that property is 1. After value assignment, each property has a corresponding property value.

The first processing sub-module 404 processes the property values based on one or more predetermined rules to obtain at least two matching result values that correspond to the at least two search term candidates.

The first processing sub-module 404 converts the property values into the matching result values based on one or more predetermined rules which may be a certain linear weighting rule or a probability model such as, for example, Maximum Entropy Model. The predetermined rules may be designated in advance according to practical needs.

Specifically, the first processing sub-module 404 may process the property values using a linear weighting approach or convert the property values into the matching result values using Maximum Entropy Model.

The first determination sub-module 405 determines whether or not a maximum matching result value of the at least two matching result values is greater than a certain threshold.

If a result determined by the first determination sub-module 405 is affirmative, a search term candidate corresponding to that matching result value is more optimal than the present search term.

The rewriting module 406 rewrites the present search term based on the matching results.

The searching module 407 performs a search based on the rewritten present search term.

The exemplary apparatus may be integrated into the server of the search engine or may be a separate entity that is communicatively coupled with the server of the search engine. Furthermore, when the disclosed method is implemented in the form of software, the method may be executed as a new function for the server of the search engine or as a separate program. The present disclosure does not impose any limitation on how to implement the disclosed method or apparatus.

In the present exemplary embodiment, the apparatus rewrites the search term and performs a search using the rewritten search term without using manually-established and fixed rules. The pre-established database may be created directly using a search log of the search engine. Alternatively or additionally, the user may set up and update the contents of the database. This not only allows the search method to obtain a higher accuracy and avoids generating ambiguities as a result of using the rules, but also improves recall rate of associated search results.

Figure 5:
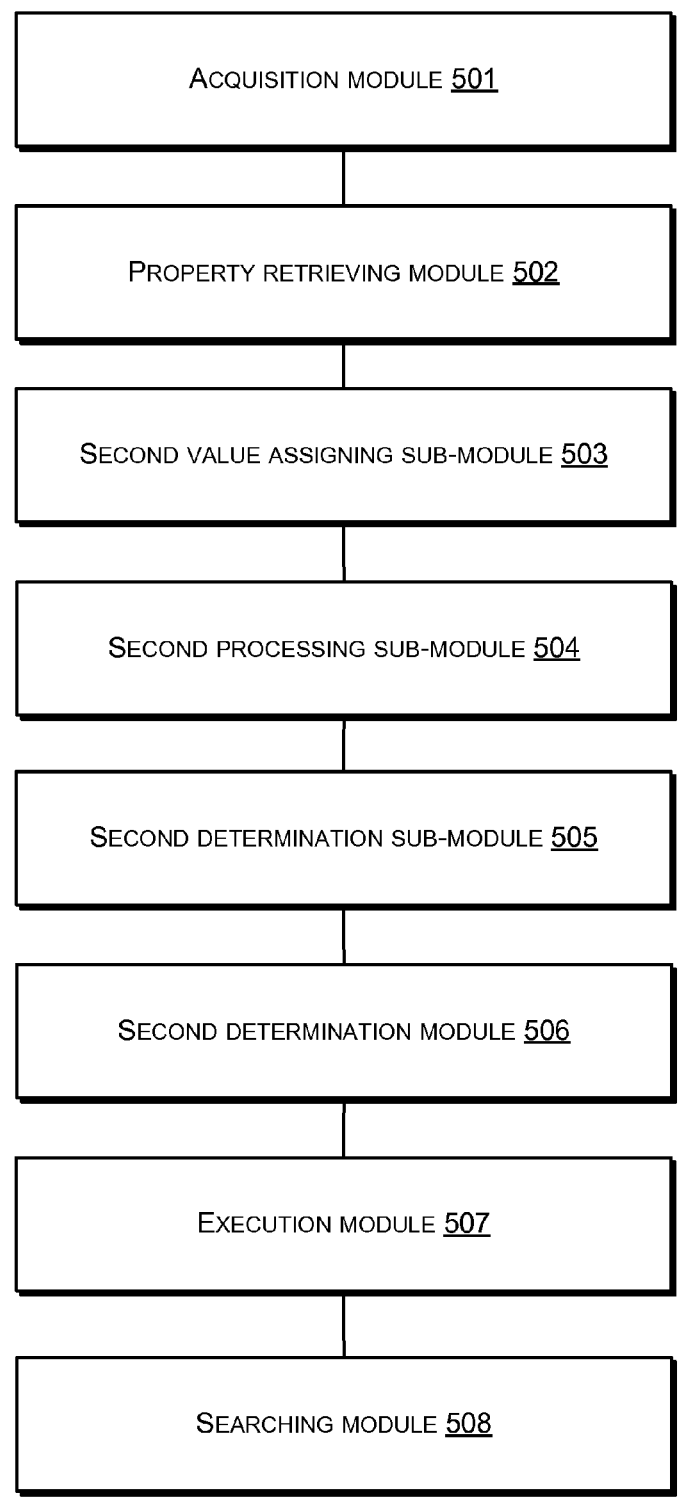
FIG. 5 shows a schematic structural diagram of a second exemplary search apparatus in accordance with the present disclosure.

Corresponding to the second exemplary method described in this disclosure, the present disclosure further provides a second exemplary search apparatus 500 as shown in FIG. 5. In this exemplary embodiment, the apparatus 500 may include an acquisition module 501, a property retrieving module 502, a second value assigning sub-module 503, a second processing sub-module 504, a second determination sub-module 505, a second determination module 506, an execution module 507, and a searching module 508.

For a present search term, the acquisition module 501 matches and obtains, from a pre-established database, one search term candidate that is relevant to the present search term.

In this exemplary embodiment, the acquisition module 501 obtains only one search term candidate from the pre-established database.

The property retrieving module 502 retrieves properties of the present search term and the search term candidate, where the properties describe a matching result of the present search term and the one search term candidate.

The second value assigning sub-module 503 assigns values to the properties of the one search term candidate and the present search term based on the matching result.

The second processing sub-module 504 processes the property values based on one or more predetermined rules to obtain a matching result value that corresponds to the one search term candidate.

The second determination sub-module 505 determines whether or not the matching result value is greater than a certain threshold.

The second determination module 506 determines whether or not a search result that corresponds to the search term candidate exists in the database.

In this exemplary embodiment, the second determination module 506 may determine whether a search result that corresponds to the search term candidate of the matching result value exists in the database. If a search result is found, relevant results can be found using this search term candidate.

The execution module 507 executes acts of rewriting the present search term into the search term candidate when a result of the second determination module is affirmative.

The searching module 508 performs a search using a result of the execution module 507.

In the present exemplary embodiment, the second determination module 506 makes determination on search results and allows rewriting of the present search term when the search term candidate has relevant search results. This not only has a higher accuracy compared with existing method of searching after rule-based rewriting of search term, but also improves recall rate of associated search results.

Figure 6:
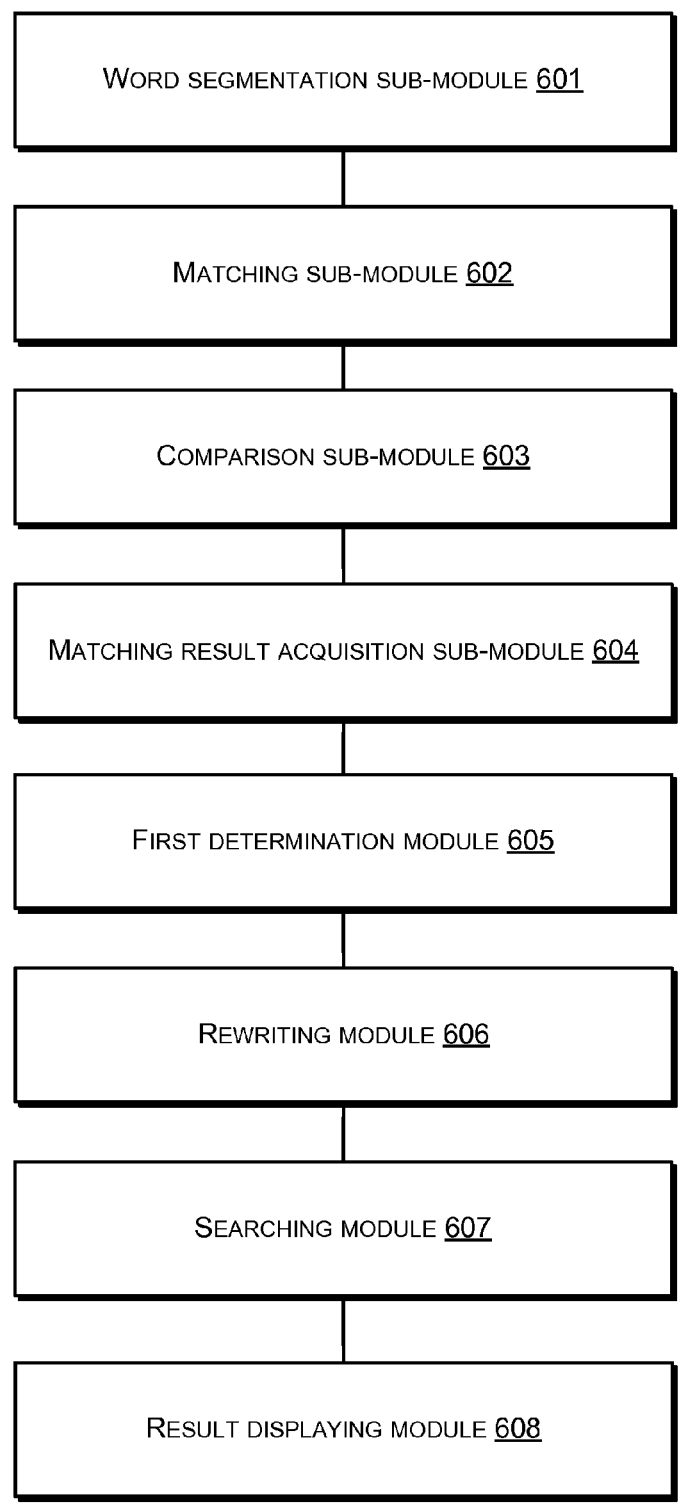
FIG. 6 shows a schematic structural diagram of a third exemplary search apparatus in accordance with the present disclosure.

Corresponding to the third exemplary method described in this disclosure, the present disclosure further provides a third exemplary search apparatus 600 which is shown in FIG. 6. In this exemplary embodiment, the apparatus 600 may include a word segmenting module 601, a matching sub-module 602, a comparing sub-module 603, a matching result acquisition sub-module 604, a first determination module 605, a rewriting module 606, a searching module 607, and a result displaying module 608.

The word segmenting module 601 segments a present search term into a plurality of child search terms, and sets up a respective identifier for each child search term.

In practice, the word segmenting module 601 may be implemented by a word segmenter.

The matching sub-module 602 matches the identifiers of the child search terms in a pre-established database to obtain a search term candidate.

The comparing sub-module 603 compares the child search terms of the present search term with the search term candidate.

The matching result acquisition sub-module 604 obtains a matching result of the child search terms and the search term candidate based on a comparison result.

The first determination module 605 determines whether or not the matching result indicates that the present search term needs to be rewritten.

The rewriting module 606 rewrites the present search term into the search term candidate.

The searching module 607 performs a search using a result of the rewriting module.

The result displaying module 608 causes search results to be displayed to the user client.

In this exemplary embodiment, when matching and obtaining a search term candidate, word segmentation of the present search term may be employed. Various search term candidate may be matched and obtained based on child search term. Therefore, the various search term candidates can be more accurately matched and obtained in the database, thus facilitating subsequent rewriting of the present search term and searching. As such, search results are more accurate with recall rate thereof being improved.

Figure 7:
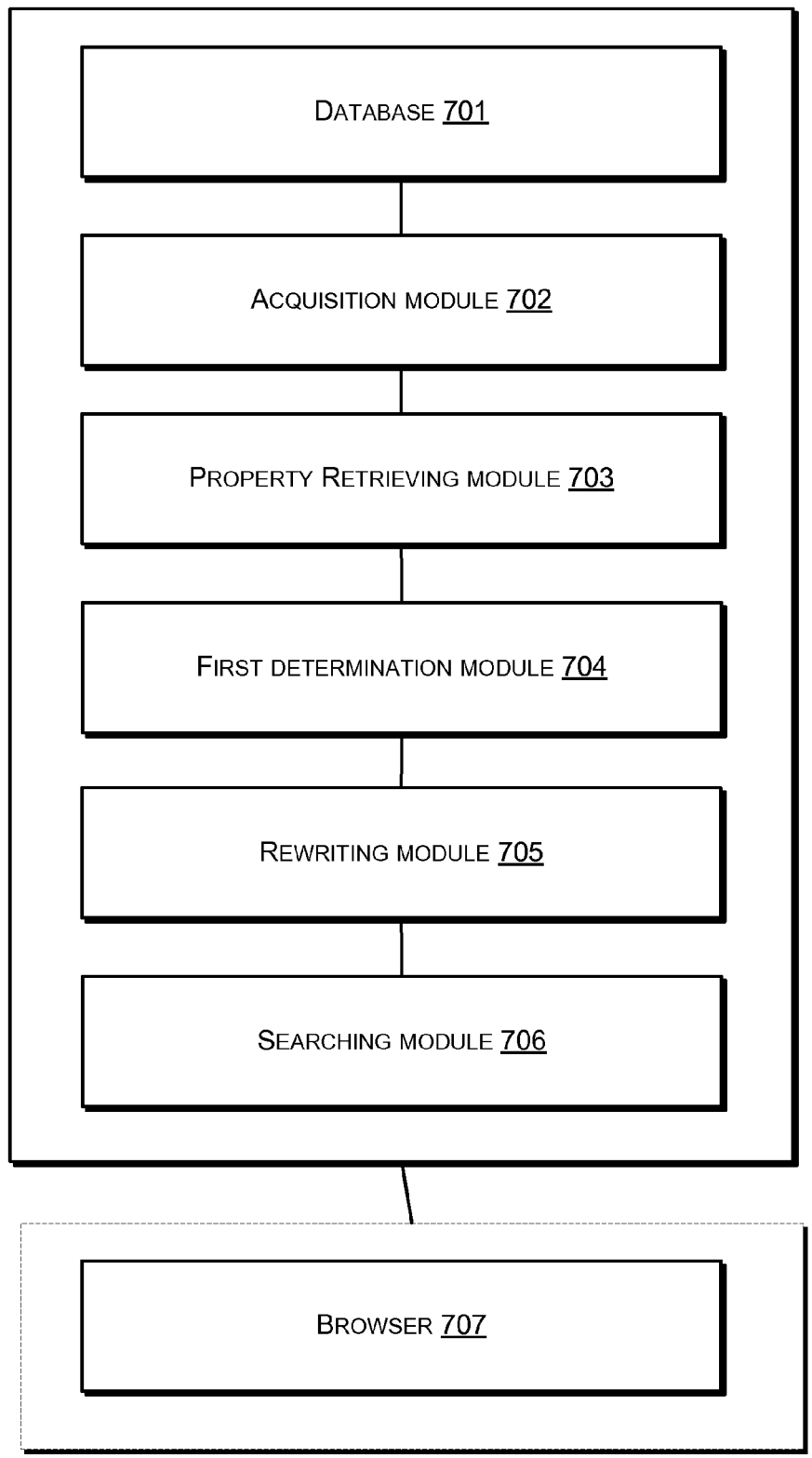
FIG. 7 shows a schematic structural diagram of an exemplary search system in accordance with the present disclosure.

Corresponding to the disclosed exemplary methods and apparatuses above, the present disclosure further provides an exemplary search system 700 as shown in FIG. 7. In this exemplary embodiment, the system 700 may include, at a server end, a database 701, an acquisition module 702, a property retrieving module 703, a first determination module 704, a rewriting module 705, and a searching module 706.

The database 701 stores historical search terms of a user client.

This pre-established database needs to be communicatively coupled to the server when acting as a separate entity, or may be integrated into the server, acting as a unit or a module of the server.

For present search term, the acquisition module 702 matches and obtains, from the pre-determined database, a search term candidate that is relevant to the present search term.

The property retrieving module 703 retrieves properties of the present search term and the search term candidate, where the properties describe a matching result of the present search term and the search term candidate.

The first determination module 704 determines whether or not the present search term needs to be rewritten based on the matching result.

The rewriting module 705 rewrites the present search term based on the matching result.

The searching module 706 performs a search using a result of the rewriting module 705.

Preferably, the system may further include a search log (not shown). The search log is communicatively coupled to the pre-established database, and provides the historical search terms of the user client or provides search results to the server, etc.

Figure 8:
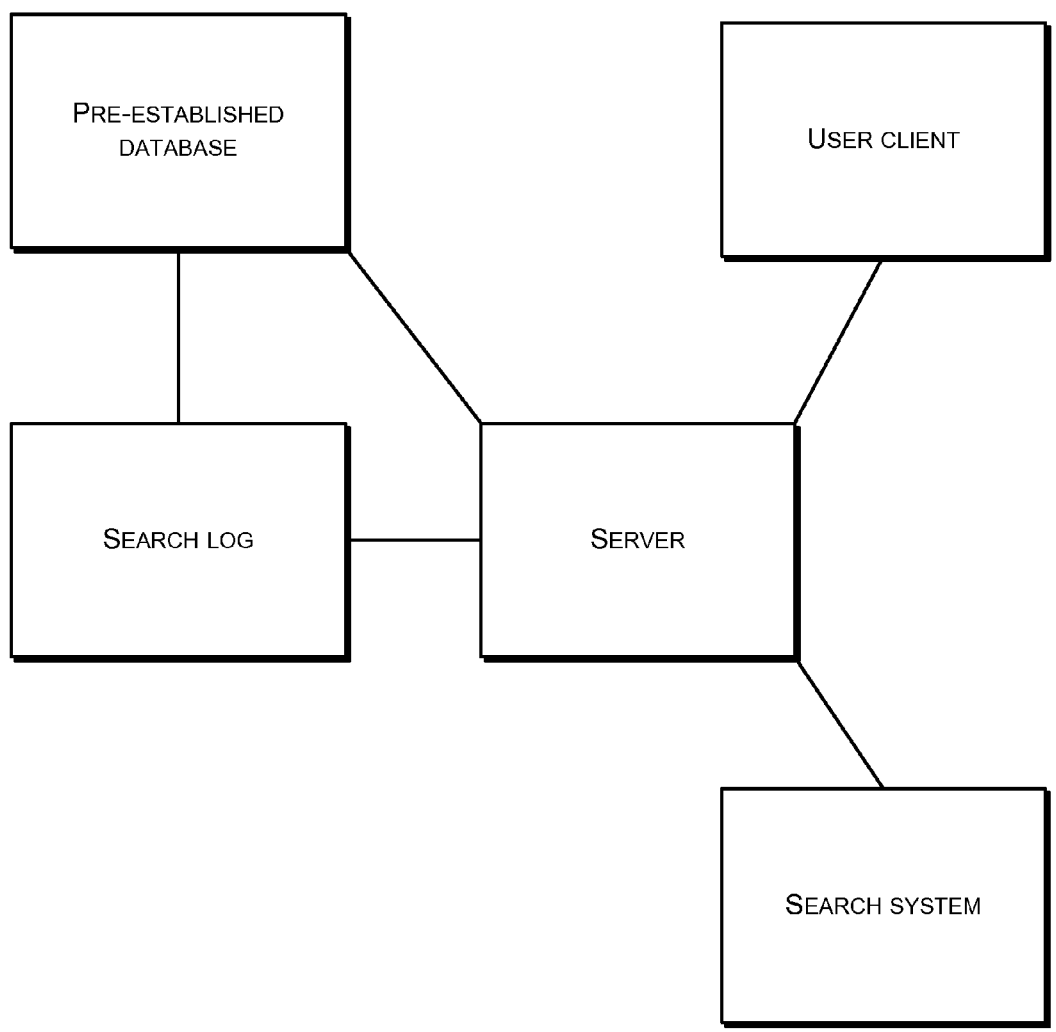
FIG. 8 shows a schematic structural diagram of an exemplary search system in a practical application in accordance with the present disclosure.

Furthermore, FIG. 8 provides a reference for a structure of various the components of the search system 700 in a practical application.

It is noted that the system may further include, at end of a user client, a browser 707 that receives the present search term from a user and submits the present search term to the server.

The present exemplary embodiment describes work interaction scenarios among the user client and various devices of the server end when the user client interacts with the server. The browser first receives a search term inputted by the user for a search and submits the present search term to the server.

It is noted that various exemplary embodiments are progressively described in the present disclosure. Each exemplary embodiment has a different focus than other exemplary embodiments. Same or similar portions of the exemplary embodiments can be mutually referenced. In particular, the exemplary apparatuses have been described in a relatively simple manner because of respective fundamental correspondence with the exemplary methods. Details thereof can be referred to related portions of respective exemplary methods.

It is further noted that terms such as "include", "have" or any other variants mean non-exclusively "comprising". Therefore, processes, methods, articles or devices which individually include a collection of features may not only be including those features, but may also include other features that are not listed, or any inherent features of these processes, methods, articles or devices. Without any further limitation, a feature defined within the phrase "include a . . . " does not exclude the possibility that process, method, article or device that recites the feature may have other equivalent features.

Finally, it is noted that any relational terms such as "first" and "second" in this document are only meant to distinguish one entity from another entity or one operation from another operation, but not necessarily request or imply existence of any real-world relationship or ordering between these entities or operations. Moreover, it is intended that terms such as "include", "have" or any other variants mean non-exclusively "comprising". Therefore, processes, methods, articles or devices which individually include a collection of features may not only be including those features, but may also include other features that are not listed, or any inherent features of these processes, methods, articles or devices. Without any further limitation, a feature defined within the phrase "include a . . . " does not exclude the possibility that process, method, article or device that recites the feature may have other equivalent features.

Search methods, search apparatuses and search system provided by in the present disclosure have been described in details above. The above exemplary embodiments are employed to illustrate the concept and implementation of the present disclosure. The exemplary embodiments are provided to facilitate understanding of the methods and respective core concepts of the present disclosure. Based on the concepts of this disclosure, one of ordinary skill in the art may make modifications to the practical implementation and application scopes. In conclusion, the content of the present disclosure shall not be interpreted as limitations of this disclosure.

What is claimed is:

1. A search method, comprising:
    obtaining from a search log database one or more search term candidates that are relevant to a present search query, wherein each one or more search term candidates includes at least one term associated with a respective property;
    for each of the one or more obtained search term candidates, retrieving, from the search log database, the respective property associated with the at least one term of the one or more search term candidates;
    for each of one or more retrieved properties of the one or more search term candidates, determining a matching result for a term in the present search query and the at least one term associated with the respective property;
    determining whether to rewrite the present search query based at least in part on one or more matching results comprising:
        assigning property values to the one or more retrieved properties of the one or more search term candidates and the present search query based at least in part on the one or more matching results;
        obtaining one or more matching result values corresponding to the property values of the one or more search term candidates, wherein the property values are processed based at least in part on a linear weighting approach or converting the property values into the one or more matching result values based at least in part on a Maximum Entropy Model; and
        determining whether the one or more matching result values are greater than a threshold; and
    responsive to determining to rewrite the present search query,
    rewriting, by a data rewriting system, the present search query to provide a rewritten present search query based at least in part on the one or more matching results, and
    performing, by a search engine, a search based at least in part on the rewritten present search query.

2. The method as recited in claim 1, wherein the search log database comprises search results corresponding to historical search terms, and wherein, upon determining to rewrite the present search query, the method further comprises:
    determining whether the one or more search term candidates corresponding to the one or more matching results have corresponding search results; and
    responsive to determining that the one or more search term candidates corresponding to the one or more matching results have corresponding search results, rewriting the present search query based at least in part on the one or more matching results.

3. The method as recited in claim 1, wherein obtaining from the search log database the one or more search term candidates that are relevant to the present search query comprises:
    segmenting the present search query to provide a plurality of child search terms;
    establishing a respective identifier for each child search term; and
    performing matching based at least in part on the respective identifier of each child search term in the search log database to obtain search term candidates of the child search terms.

4. The method as recited in claim 3, wherein retrieving the respective property associated with the at least one term of the one or more search term candidates comprises:

comparing the child search terms with the search term candidates of the child search terms to provide a comparison result; and obtaining a plurality of matching results between the child search terms and the search term candidates of the child search terms based at least in part on the comparison result.

5. The method as recited in claim 1, wherein, after performing a search based on the rewritten present search query, the method further comprises:

causing a search result to be displayed to a user client.

6. A search apparatus, comprising:

at least one processor; and at least one storage device that stores instructions that, when executed by the at least one processor, implement:

an acquisition module that obtains, from a search log database, one or more search term candidates that are relevant to a present search query, wherein each of the one or more search term candidates includes at least one term associated with a respective property;

a property retrieving module that retrieves, from the search log database, for each of the one or more search term candidates, the respective property associated with the at least one term of the one or more search term candidates;

a first determination module that determines a matching result for a term in the present search query with the at least one term of the one or more search term candidates associated with the respective property and determines whether to rewrite the present search query based at least in part on the matching result, the first determination module comprising:

a value assigning sub-module that assigns values to the respective property based at least in part on the matching result with each respective property having a corresponding property value;

a processing sub-module that obtains at least two matching result values that correspond to a given property value of at least two search term candidates, wherein the processing sub-module processes the given property value based at least in part on a linear weighting approach or converts the given property value into the matching result based at least in part on a Maximum Entropy Model; and a determination sub-module that determines whether a maximum matching result value of the at least two matching result values is greater than a threshold;

a rewriting module that rewrites the present search query based at least in part on the matching result; and a searching module that performs a search using the rewritten present search query.

7. The apparatus as recited in claim 6, wherein, the search log database comprises search results of historical search terms, the apparatus further comprises:

a second determination module that determines whether the one or more search term candidates corresponding to the matching result have corresponding search results; and an execution module that rewrites the present search query based at least in part on the matching result responsive to a determination that the one or more search term candidates corresponding to the matching result have the corresponding search results.

8. The apparatus as recited in claim 6, wherein the acquisition module comprises:

a word segmenting sub-module that segments the present search query into a plurality of child search terms and establishes a respective identifier for each child search term; and a matching sub-module that obtains the one or more search term candidates from the search log database based at least in part on the respective identifier of each child search term.

9. The apparatus as recited in claim 8, wherein the acquisition module further comprises:

a comparison sub-module that compares the child search terms with the one or more search term candidates to provide a comparison result; and a matching result acquisition sub-module that obtains matching results between the child search terms and the one or more search term candidates based at least in part on the comparison result.

10. The apparatus as recited in claim 6, further comprising:

a result displaying module that causes a search result to be displayed to a user client.

11. A search system, comprising:

at least one processor; and at least one storage device that stores instructions, which when executed by the at least one processor, implement:

a data rewriting system that:

obtains, from a search log database, one or more search term candidates that are relevant to a present search query, wherein each search term candidate includes at least one term associated with a respective property;

retrieves, from the search log database and for each of the one or more obtained search term candidates, the respective property associated with the at least one term;

determines a matching result for a term in the present search query with the at least one term of each search term candidate associated with the respective property;

determines whether to rewrite the present search query based at least in part on the matching result, wherein determining whether to rewrite the present search query comprises:

assigning values to one or more properties of the one or more search term candidates and the present search query based at least in part on the matching result;

obtaining one or more matching result values corresponding to a property value of the one or more search term candidates, wherein the property value is processed based at least in part on a linear weighting approach or the property value is converted into the matching result based at least in part on a Maximum Entropy Model; and determining whether the matching result is greater than a threshold; and rewrites the present search query based at least in part on the matching result to provide a rewritten present search query; and a search engine that performs a search based at least in part on the rewritten present search query.

12. A search method, comprising:

receiving a present search query submitted by a user, the present search query comprising a first number of terms;

obtaining from a database a search query candidate comprising a second number of terms, wherein the database stores search query candidates and associates properties with terms of the stored search query candidates, wherein each property is descriptive of an attribute corresponding to an associated term;

identifying one or more properties of the present search query, wherein each identified property is associated with at least one term of the first number of terms of the present search query and is descriptive of a respective attribute corresponding to the at least one associated term;

matching the one or more identified properties of the present search query with the properties of the search query candidate to determine a property-match result; and determining whether to rewrite the present search query based at least on the property-match result, wherein determining whether to rewrite the present search query comprising:

assigning values to the properties of the search term candidate and the present search query based at least in part on the property-match result, wherein assigning the values comprises obtaining one or more matching result values corresponding to a property value of the search term candidate, wherein the property value is processed based at least in part on a linear weighting approach or the property value is converted into a matching result value based at least in part on a Maximum Entropy Model; and determining whether the matching result value is greater than a threshold; and responsive to determining to rewrite the present search query, rewriting, by a data rewriting system, the present search query to provide a rewritten present search query based at least on the property-match result; and performing, by a search engine, a search based at least on the rewritten present search query.

13. The search method as recited in claim 12, further comprising:

prior to identifying the properties of the present search query, segmenting the present search query into the number of terms.

14. The search method as recited in claim 12, wherein a set of properties includes at least one of a brand, a model number, and a product type, and wherein identifying the properties of the present search query comprises:

identifying a term of the number of terms of the present search query as corresponding to a property of the set of properties; and associating the identified term with the corresponding property.

15. The search method as recited in claim 14, wherein matching the one or more identified properties of the present search query with the properties of the search query candidate to determine the property-match result further comprises:

determining whether a term of the search query candidate is associated with a property that is the same as the corresponding property associated with the identified term of the present search query; and responsive to determining that the term of the search query candidate and the identified term of the present search query are associated with a same property, assigning a property value to the same property, wherein the property-match result is based at least in part on the property value of the same property.

* * * * *